(12) United States Patent
Motohashi et al.

(10) Patent No.: US 11,097,448 B2
(45) Date of Patent: *Aug. 24, 2021

(54) FIBER-REINFORCED RESIN MOLDING MATERIAL AND PRODUCTION METHOD THEREFOR

(71) Applicant: Toray Industries, Inc., Tokyo (JP)

(72) Inventors: Tetsuya Motohashi, Nagoya (JP); Takafumi Hashimoto, Nagoya (JP); Katsuhiro Miyoshi, Nagoya (JP); Tamotsu Suzuki, Otsu (JP); Yasumoto Noguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 16/084,373

(22) PCT Filed: Feb. 23, 2017

(86) PCT No.: PCT/JP2017/006716
§ 371 (c)(1),
(2) Date: Sep. 12, 2018

(87) PCT Pub. No.: WO2017/159263
PCT Pub. Date: Sep. 21, 2017

(65) Prior Publication Data
US 2019/0084186 A1    Mar. 21, 2019

(30) Foreign Application Priority Data

Mar. 15, 2016  (JP) .............................. JP2016-050815

(51) Int. Cl.
*B29B 11/16* (2006.01)
*B29C 70/12* (2006.01)
*B29K 307/04* (2006.01)

(52) U.S. Cl.
CPC .............. *B29B 11/16* (2013.01); *B29C 70/12* (2013.01); *B29C 2793/00* (2013.01); *B29K 2307/04* (2013.01)

(58) Field of Classification Search
CPC ....... B29C 70/12; B29C 70/545; B29C 70/14; B29C 70/502; B29C 43/34; C08J 5/24;
(Continued)

(56) References Cited

U.S. PATENT DOCUMENTS

2019/0091944 A1* 3/2019 Motohashi .............. B29C 70/14

FOREIGN PATENT DOCUMENTS

JP    2008-174605 A    7/2008
JP    2009-062474 A    3/2009
(Continued)

*Primary Examiner* — Camie S Thompson
(74) *Attorney, Agent, or Firm* — DLA Piper LLP (US)

(57) ABSTRACT

A fiber-reinforced resin molding material containing at least bundled aggregates [A] of discontinuous reinforcing fibers and a matrix resin [M], wherein each of the bundled aggregates [A] is obtained by cutting a partially-separated fiber bundle, prepared by forming separation treatment sections separated into a plurality of bundles and non-separation treatment sections alternately along a lengthwise direction of a fiber bundle including a plurality of single fibers, at an angle θ (0°<θ<90°) with respect to the lengthwise direction of the fiber bundle.

10 Claims, 9 Drawing Sheets

Distribution diagram of discontinuous reinforcing fiber bundled aggregate

(58) Field of Classification Search
CPC . C08J 5/042; C08J 5/047; B29B 11/16; B29B 15/08; B29B 11/02; C08L 63/10; B29K 2307/04; B29K 2105/128; B29K 2995/0082; D04H 1/4242; D04H 1/72; Y10T 428/24479; Y10T 428/268
USPC .................. 428/299.1, 297.4, 156, 220, 338
See application file for complete search history.

(56) References Cited

FOREIGN PATENT DOCUMENTS

| | | |
|---|---|---|
| JP | 2009-191116 A | 8/2009 |
| JP | 2010-163536 A | 7/2010 |
| JP | 2012-158847 A | 8/2012 |
| JP | 2013-202890 A | 10/2013 |
| WO | 2014-021315 A1 | 2/2014 |
| WO | 2016/043037 A1 | 3/2016 |
| WO | 2016/047412 A1 | 3/2016 |
| WO | 2016/104154 A1 | 6/2016 |
| WO | 2016/158436 A1 | 10/2016 |
| WO | 2017/006989 A1 | 1/2017 |

* cited by examiner

FIBER-REINFORCED RESIN MOLDING MATERIAL AND PRODUCTION METHOD THEREFOR

TECHNICAL FIELD

This disclosure relates to a fiber-reinforced resin molding material containing a bundled aggregate of discontinuous reinforcing fibers, in particular, a specific form of a bundled aggregate of discontinuous reinforcing fibers, and a matrix resin, and a production method therefor.

BACKGROUND

A technology for molding a molded article having a desired shape by heating and pressurizing molding is known. It uses a fiber-reinforced resin molding material comprising bundled aggregates (hereinafter, also referred to as fiber bundles) of discontinuous reinforcing fibers (for example, carbon fibers) and a matrix resin (for example, a thermosetting resin or a thermoplastic resin) (for example, JP-A-2013-202890, JP-A-2008-174605, JP-A-2009-191116, JP-A-2010-163536 and WO 2014/021315). In such a conventional fiber-reinforced resin molding material, when the fiber bundle in the fiber-reinforced resin molding material is composed of a fiber bundle formed from a predetermined strand and having a predetermined number of single fibers, usually, in a molding material comprising a fiber bundle with a large number of single fibers, although the flowability during molding is excellent, the mechanical properties of a molded article tend to be inferior.

For example, in JP '890, a molding material in which the number of filaments of a chopped fiber bundle in the molding material is specified within a range of 10,000 to 700,000, is disclosed. In such a molding material, since the number of filaments of the fiber bundle is large, at the time of molding, reinforcing fibers can move efficiently in a form of a fiber bundle together with a resin so that excellent flowability can be obtained. However, with respect to a molded article after molding with that molding material, there is a high possibility that stress concentration occurs at the end portion of the fiber bundle and the like in the molded article, for example, when the molded article breaks and, therefore, it is not suitable for molding a molded article required with high mechanical properties.

On the other hand, for example, in JP '605, a fiber-reinforced resin using a fiber bundle which is separated so that the number of single fibers becomes 100 or less is disclosed. However, as compared to the example disclosed in the above-described JP '890, since the number of single fibers of the fiber bundle is much smaller, the reinforcing fibers are well dispersed in a molded article, the possibility of stress concentration occurring at the end portion of the fiber bundle or the like in the molded article decreases, and the mechanical properties of the molded article are increased, on the other hand, a possibility is left that high flowability cannot be obtained at the time of molding as expected.

As described above, in a fiber-reinforced resin molding material using a fiber bundle having a relatively large number of single fibers, excellent productivity and excellent flowability during molding tend to be obtained, but the mechanical properties of a molded article tend to be inferior and, on the contrary, in a fiber-reinforced resin molding material using a fiber bundle having a relatively small number of single fibers, the mechanical properties of a molded article tend to be excellent, but it tends to be difficult to improve the flowability during molding.

Focusing on the tendency in the prior art as described above, although it still has not been published yet, a fiber-reinforced resin molding material containing at least bundled aggregates of discontinuous reinforcing fibers and a matrix resin has been previously proposed by us wherein the bundled aggregate of the reinforcing fibers contains both of reinforcing fiber aggregates A formed by cutting a strand of continuous reinforcing fibers after subjecting the strand to a splitting treatment to completely divide the strand into a plurality of bundles, and reinforcing fiber aggregates B containing undivided portions which are not subjected to the splitting treatment or/and in which the splitting treatment is insufficient, at a predetermined proportion (PCT/JP2015/074736). That proposal makes it possible to achieve both of good flowability during molding and excellent mechanical properties of a molded article at a good balance.

However, higher mechanical properties (strength, elastic modulus) of a molded article and further reduction of its variation are being required than those of the fiber-reinforced resin molding material in the above-described previous proposal.

Accordingly, in view of the requirement as described above, it could be helpful to provide a fiber-reinforced resin molding material capable of having higher mechanical properties (strength, elastic modulus) and further reducing its variation as compared to those in the above-described previous proposal and a production method therefor.

SUMMARY

A fiber-reinforced resin molding material contains at least bundled aggregates [A] of discontinuous reinforcing fibers and a matrix resin [M], and is characterized in that each of the bundled aggregates [A] is obtained by cutting a partially-separated fiber bundle, prepared by forming separation treatment sections separated into a plurality of bundles and non-separation treatment sections alternately along a lengthwise direction of a fiber bundle comprising a plurality of single fibers, at an angle $\theta$ ($0°<\theta<90°$) with respect to the lengthwise direction of the fiber bundle.

In such a fiber-reinforced resin molding material, the bundled aggregate [A] of discontinuous reinforcing fibers is formed by cutting the partially-separated fiber bundle in which separation treatment sections and non-separation treatment sections are alternately formed, obliquely with respect to the lengthwise direction of the fiber bundle, that is, at an angle $\theta$ ($0°<\theta<90°$) with respect to the lengthwise direction of the fiber bundle. Namely, in the fiber-reinforced resin molding material previously proposed, the bundled aggregate [A] of discontinuous reinforcing fibers was formed by cutting in a direction orthogonal to the lengthwise direction of the fiber bundle, but here, in particular, it is formed by cutting the partially-separated fiber bundle, in which separation treatment sections and non-separation treatment sections are alternately formed, obliquely with respect to the lengthwise direction of the fiber bundle. By being cut obliquely with respect to the lengthwise direction of the fiber bundle, it becomes possible that the cutting plane extends over the separation treatment section and the non-separation treatment section, whereby, in particular, the end portion of the formed bundled aggregate [A] is liable to be formed in a shape in which a stress is difficult to be concentrated in the molded article (various examples will be described later) and, further, it also becomes possible to reduce the width of a fiber bundle like the reinforcing fiber aggregate B in the aforementioned PCT/JP2015/074736. As a result, in the molded article, it is possible to exhibit higher mechanical properties (strength, elastic modulus) and further reduce the variation of the mechanical properties. With respect to good flowability during molding, it is ensured by the configuration that the partially-separated fiber bundle is cut into bundled aggregates [A] of discontinuous reinforcing fibers.

In the above-described fiber-reinforced resin molding material, structure can be employed wherein, in the partially-separated fiber bundle, an entangled part in which the single fibers are tangled with each other and/or an entanglement accumulation part in which the entangled parts are accumulated is formed in at least one end portion of at least one of the separation treatment sections.

Further, in the fiber-reinforced resin molding material, a structure can be employed wherein the bundled aggregate [A] contains at least one kind of aggregate selected from:

a separated bundle aggregate [a] divided into an arbitrary number of bundles by separation treatment;

a joined bundle aggregate [b] in which single fibers of the fiber bundle are joined to each other by the non-separation treatment section and/or the entangled part and/or the entanglement accumulation part; and a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part. In this structure, it is preferred that, in the bundled aggregate [A], the content of the joined bundle aggregate [b] is in a range of 0 to 15%. Namely, although the joined bundle aggregate [b] may not be contained, in case of being contained, it is preferred to suppress the content at 15% at highest.

We also provide a method of producing the fiber-reinforced resin molding material as described above. Namely, the method of producing a fiber-reinforced resin molding material is a method of producing the fiber-reinforced resin molding material as described above, wherein the partially-separated fiber bundle is cut to satisfy equation (1) when the bundled aggregate [A] is obtained:

$$W \cdot \cos \theta / D \geq 3 \quad (1)$$

W: width of fiber bundle at cutting partially-separated fiber bundle
D: distance between cutting planes in bundled aggregate [A].

In the method of producing a fiber-reinforced resin molding material it is preferred that the partially-separated fiber bundle is subjected to widening treatment at an arbitrary timing before cutting the partially-separated fiber bundle. This widening treatment may be carried out either before or after formation of the partially-separated fiber bundle as long as it is before the cutting of the partially-separated fiber bundle and, for example, when forming a partially-separated fiber bundle a widening treatment may be carried out simultaneously to form a so-called widened partially-separated fiber bundle, or a widening treatment may be carried out immediately before cutting the partially-separated fiber bundle and the widened one may be introduced continuously into the cutting process.

According to the fiber-reinforced resin molding material and the production method therefor, by having the specified bundled aggregate [A] of discontinuous reinforcing fibers formed by cutting the partially-separated fiber bundle, in which separation treatment sections and non-separation treatment sections are alternately formed, obliquely with respect to the lengthwise direction of the fiber bundle, it is possible to achieve extremely high mechanical properties (strength, elastic modulus) when made into a molded article and at the same time, the variation thereof can be suppressed small.

Figure 1:
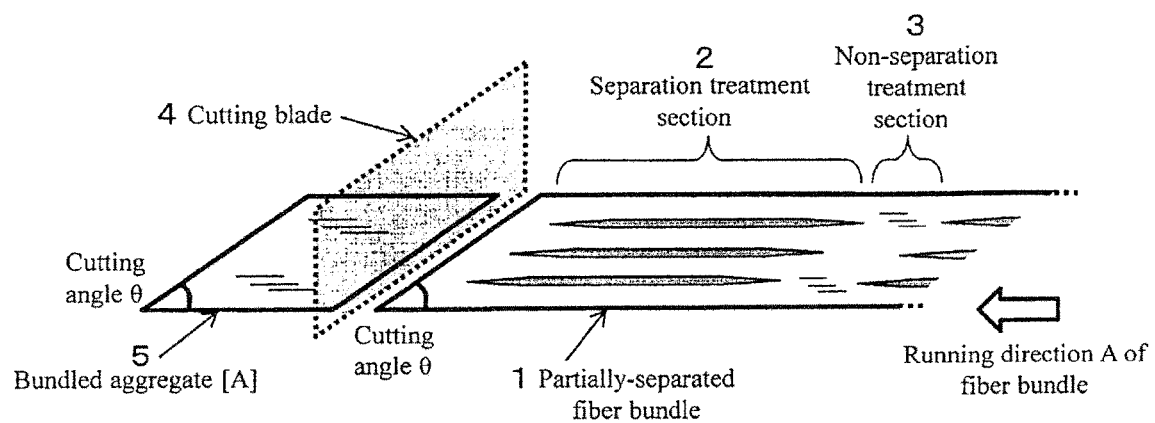
FIG. 1 is a schematic perspective view showing a partially-separated fiber bundle and its cutting.

EXPLANATION OF SYMBOLS 1, 17, 31, 41, 51, 61, 71, 81, 91: partially-separated fiber bundle
2, 13, 15, 23, 32, 42, 64, 74: separation treatment section
3, 14, 16, 28, 33, 52, 62, 72, 82: non-separation treatment section
4: Cutting blade
5: bundled aggregate [A]
11, 25, 63: entangled part
12, 26, 73: entanglement accumulation part
20: fiber bundle
21: separation means
22: protrusion
24: contact part
27: fluff accumulation
34, 35, 43, 53, 65, 75, 83, 92: cutting plane
36, 37: bundled aggregate
100: winding direction of bobbin
101: drawing direction of fiber bundle
102: unwinding twist
103: partially-separated fiber bundle containing unwinding twist

DETAILED DESCRIPTION

Hereinafter, our molding materials and methods will be explained together with examples referring to figures.

In FIG. 1, a partially-separated fiber bundle, prepared by forming separation treatment sections separated into a plurality of bundles and non-separation treatment sections alternately along a lengthwise direction of a fiber bundle comprising a plurality of single fibers and its cutting, will be explained. As shown in FIG. 1, a partially-separated fiber bundle 1 in which separation treatment sections 2 and non-separation treatment sections 3 are alternately formed along the lengthwise direction of the fiber bundle is run in the direction A, and the fiber bundle 1 is cut by a cutting blade 4 in a direction traversing the fiber bundle 1 to form bundled aggregate [A] 5 of discontinuous reinforcing fibers. At this time, it is cut at an angle θ with respect to the lengthwise direction of the fiber bundle, and the cutting angle θ is set at an oblique cut of $0°<θ<90°$. In the fiber-reinforced resin molding material in the aforementioned previous proposal, the angle is set in a direction orthogonal to the lengthwise direction of the fiber bundle (θ=90°). The preferable range of the angle θ is $0°<θ<45°$, more preferably $50<θ<30°$. In such a range, it is possible to achieve both high mechanical properties and low variation thereof, and realize a high processability that can suppress cutting mistakes and cut at a desired angle.

Figure 2:
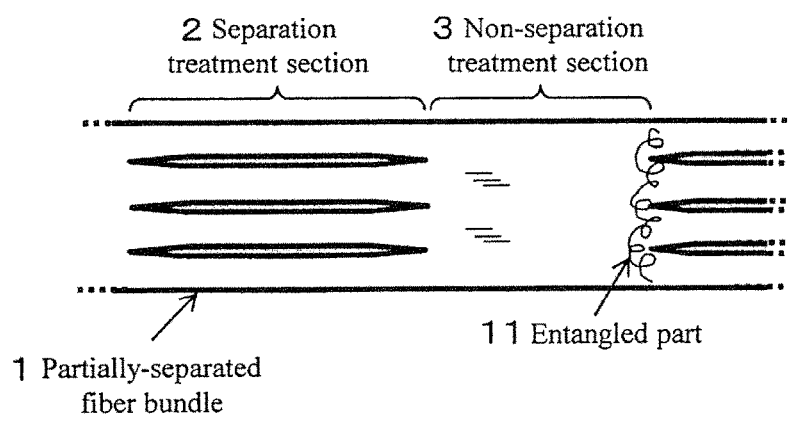
FIG. 2 is a schematic plan view of a fiber bundle showing an example of a partially-separated fiber bundle.
Figure 3:
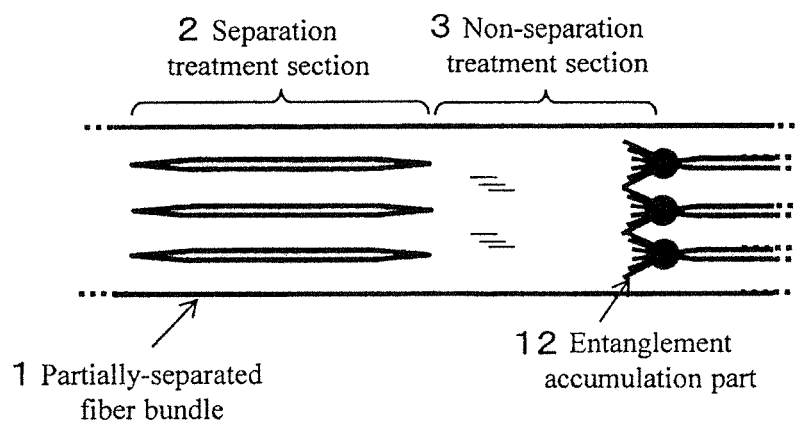
FIG. 3 is a schematic plan view of a fiber bundle showing another example of a partially-separated fiber bundle.

Although the partially-separated fiber bundle 1 before cutting basically has a form in which separation treatment sections 2 and non-separation treatment sections 3 as shown in FIG. 1 are alternately formed along the lengthwise direction of the fiber bundle as shown in FIG. 2 or 3, an example, wherein an entangled part 11 in which single fibers are tangled with each other and/or an entanglement accumulation part 12 in which the entangled parts are accumulated in at least one end portion of at least one separation treatment section 2, can be also employed.

Figure 4:
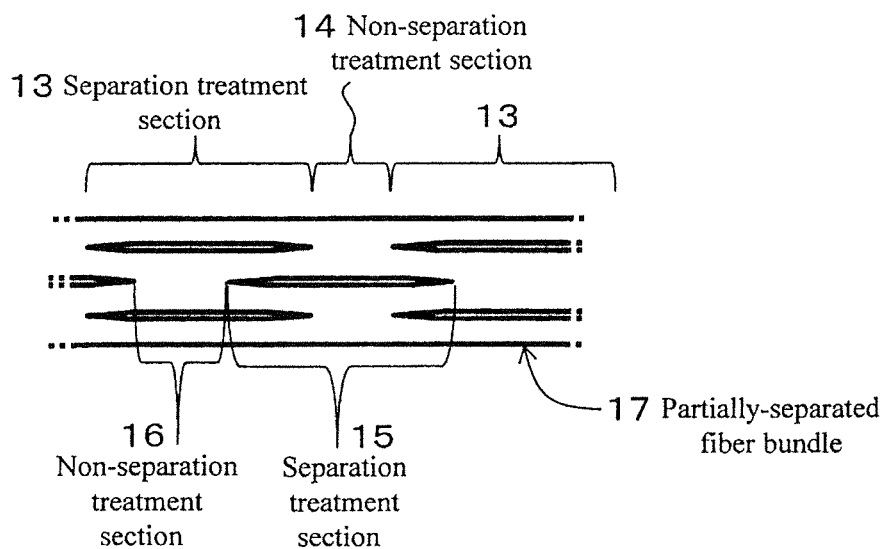
FIG. 4 is a schematic plan view of a fiber bundle showing a further example of a partially-separated fiber bundle.

Further, as shown in FIG. 4, a partially-separated fiber bundle 17 comprising a combination of a formation in which the separation treatment sections 13 and the non-separation treatment sections 14 are alternately formed along the lengthwise direction of the fiber bundle and a formation in which the separation treatment sections 15 and the non-separation treatment sections 16 are formed along the lengthwise direction of the fiber bundle, and wherein one separation treatment sections 15 are formed to extend over the other non-separation treatment sections 14, is also included in the partially-separated fiber bundle.

Figure 5:
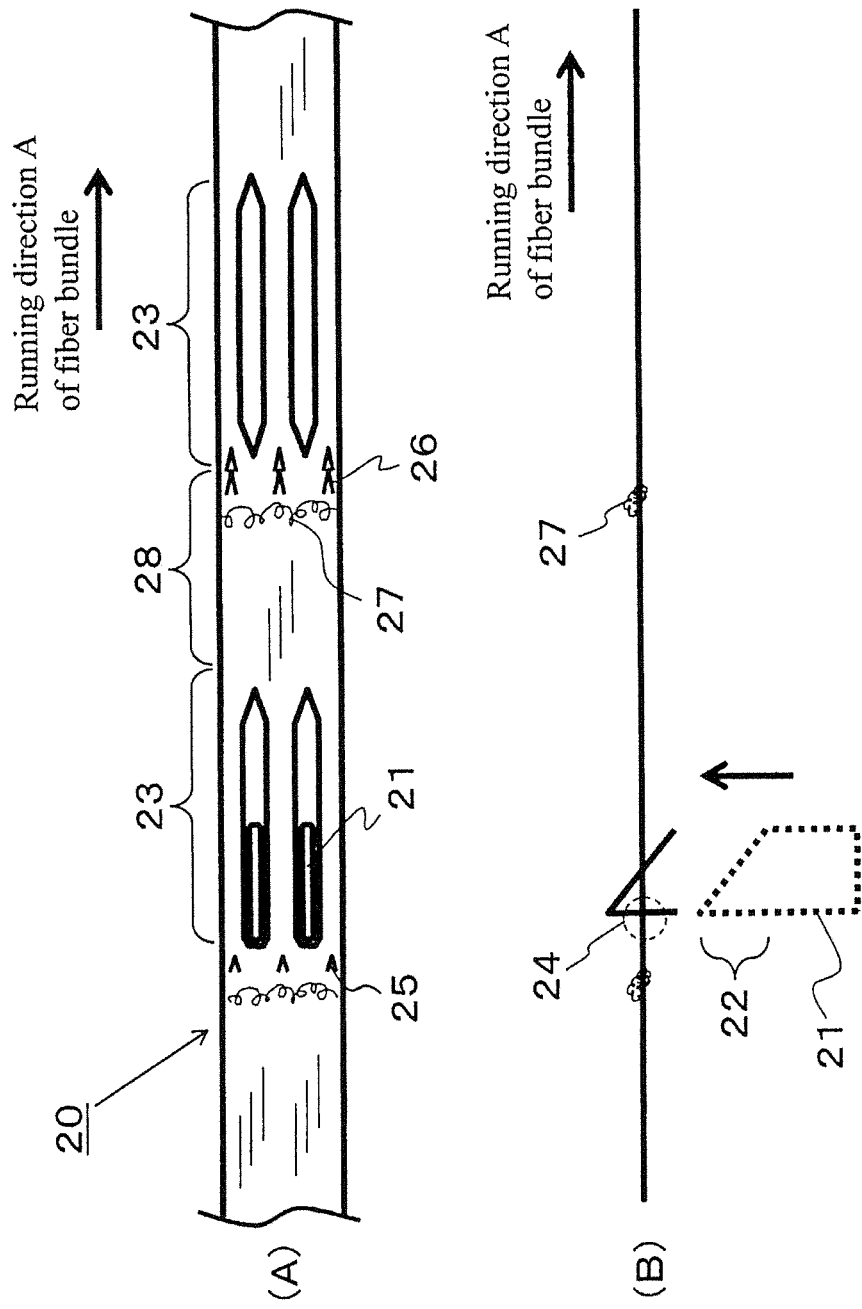
FIG. 5 is a schematic plan view (A) and a schematic side view (B) showing an example of a method of manufacturing a partially-separated fiber bundle.

The partially-separated fiber bundle as described above is formed, for example, as shown in FIG. 5, although it is not particularly limited. FIG. 5 is a schematic plan view (A) and a schematic side view (B) showing an example in which a separation means 21 is pierced into a running fiber bundle 20. The running direction A of the fiber bundle (the arrow) in the figure is the lengthwise direction of the fiber bundle 20, indicating that the fiber bundle 20 is continuously supplied from a fiber bundle supply device (not shown). The separation means 21 has a protrusion 22 having a protruding shape which is easy to be pierced into the fiber bundle 20, is pierced into the running fiber bundle 20, and generates separation treatment sections 23 substantially parallel to the lengthwise direction of the fiber bundle 20. Depending on the number of fiber bundles to be separated, it is also possible to simultaneously use a plurality of separation means 21. It is possible to arbitrarily arrange a plurality of protrusions 22 by a manner such as arranging a plurality of separation means 21 in parallel, by turns, or by shifting the phase.

When the fiber bundle 20 comprising a plurality of single fibers is divided into separated bundles having a lesser number of single fibers by the separation means 21, there is a possibility that, because a plurality of single fibers are not aligned substantially in the fiber bundle 20, but in single fiber level there are many portions where single fibers are tangled with each other, entangled parts 25, each in which single fibers are tangled with each other, may be formed in the vicinity of contact part 24 in the separation treatment. "Forming the entangled part 25" means, for example, forming (moving) the entanglement of single fibers existing beforehand in the separation treatment sections in the contact part 24 by the separation means 21, forming (manufacturing) an aggregate newly entangled with single fibers by the separation means 21 or the like.

After generating separation treatment sections 23 in an arbitrary range, the separation means 21 is pulled out from the fiber bundle 20. By this pulling out, separation treatment sections 23 subjected to the separation treatment are created and, at the same time, entanglement accumulation parts 26 accumulated with entangled parts 25 are created. Further, fluffs generated from the fiber bundle during the separation treatment may form a fluff accumulation 27 near the entanglement accumulation part 26 at the time of the separation treatment.

Thereafter, by piercing the separation means 21 again into the fiber bundle 20, non-separation treatment sections 28 are created.

In the fiber bundle of reinforcing fibers, the kind of fibers is not particularly limited as long as it is a fiber bundle comprising a plurality of single fibers. In particular, at least one selected from the group consisting of carbon fibers, aramid fibers and glass fibers is preferred. These may be used alone, or two or more of them can be used in combination. In particular, carbon fibers are particularly preferable because they can provide a lightweight composite material excellent in strength. As the carbon fibers, any of PAN type and pitch type may be used, and the average fiber diameter thereof is preferably 3 to 12 μm, more preferably 6 to 9 μm.

In carbon fibers, usually, a fiber bundle in which 3,000 to 60,000 single fibers made of continuous fibers are bundled is supplied as a yarn wound body (package) wound on a bobbin. Although the fiber bundle is preferred to be untwisted, a strand with twists can also be used, and even if twisting occurs during conveyance, it can be applied. There is no restriction on the number of single fibers, and in using a so-called large tow with a large number of single fibers, since the price per unit weight of fiber bundle is inexpensive, as the number of single fibers is larger, the cost of the final product can be reduced preferably. Further, as a large tow, a so-called doubling form in which fiber bundles are wound together in a form of one bundle may be used.

When the reinforcing fibers as described above are used, it is preferred that they are surface treated for the purpose of improving the adhesiveness to a matrix resin [M] and the like. As the method for the surface treatment, there are electrolytic treatment, ozone treatment, ultraviolet treatment and the like. Further, a sizing agent may also be added for the purpose of preventing fluffing of reinforcing fibers, improving convergence of fiber bundle, improving adhesiveness with matrix resin [M] and the like. As the sizing agent, although not particularly limited, a compound having a functional group such as an epoxy group, a urethane group, an amino group, a carboxyl group and the like can be used, and one type thereof may be used alone or two or more types thereof may be used together in combination.

The fiber bundle is preferably in a state of being bundled in advance. The state being bundled in advance means, for example, a state bundled due to entanglement of single fibers constituting the fiber bundle with each other, a state bundled by a sizing agent applied to the fiber bundle, and a state bundled due to twists being contained in the production process of the fiber bundle.

Figure 6:
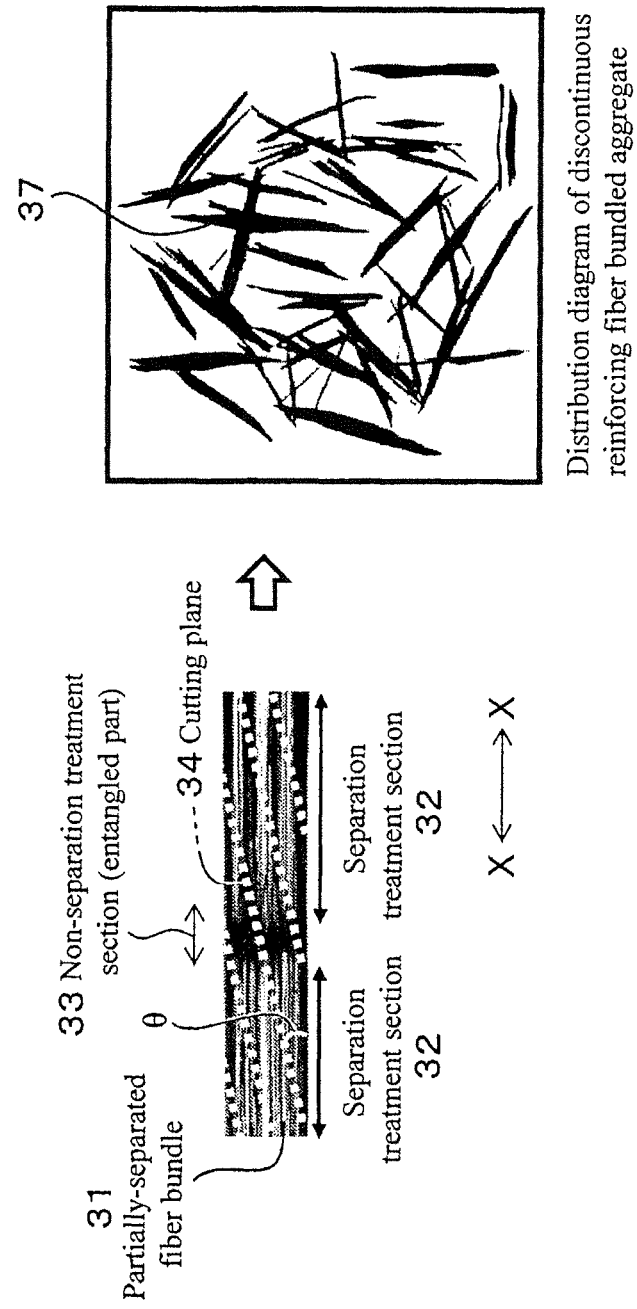
FIG. 6 is a schematic plan view of a partially-separated fiber bundle showing a basic technical concept of oblique cutting.
Figure 7:
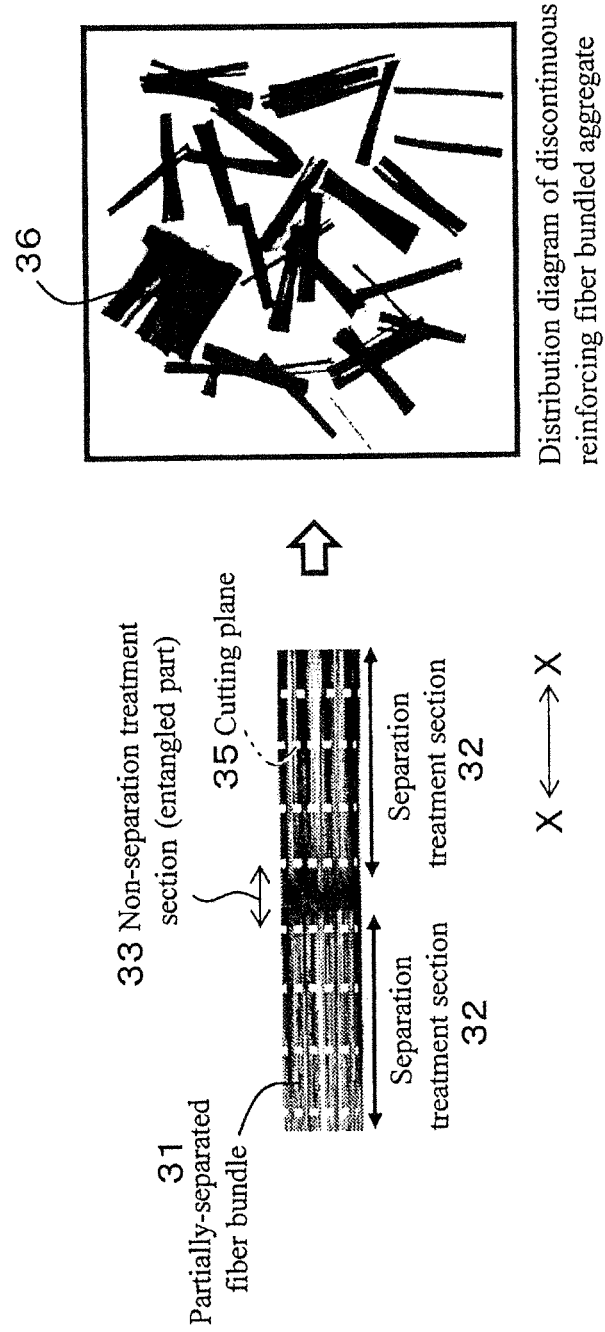
FIG. 7 is a schematic plan view of a partially-separated fiber bundle showing an example of orthogonal cutting.

Next, in FIG. 6, the basic technical concept employing the oblique cutting of a partially-separated fiber bundle will be explained as compared to FIG. 7 employing the orthogonal cutting of a partially-separated fiber bundle. In FIGS. 6 and 7, symbol 31 denotes a partially-separated fiber bundle, wherein along the lengthwise direction of a fiber bundle composed of a plurality of single fibers, separation treatment sections 32 each of which is separated into a plurality of bundles and non-separation treatment sections 33 including the aforementioned entangled part and the like are alternately formed. In FIG. 7, the cutting plane 35 for the partially-separated fiber bundle 31 is set in a direction (90° direction) orthogonal to the lengthwise direction X-X of the fiber bundle, whereas in our method, the angle θ of the cutting plane 34 with respect to the lengthwise direction X-X of the fiber bundle is set at an angle θ (0°<θ<90°) in an oblique direction.

Then, when burning off a matrix resin [M] from a molded article molded by randomly dispersing a fiber-reinforced resin molding material containing bundled aggregates [A] of discontinuous reinforcing fibers obtained by the above-described cutting and the matrix resin [M], heating and pressing, and leaving only bundled aggregates [A] of discontinuous reinforcing fibers to observe them as a plan view, the distribution diagrams of discontinuous reinforcing fiber bundled aggregates, for example, as exemplified in the right sides of FIGS. 6 and 7, are obtained. In the distribution diagram shown in FIG. 7, bundled aggregates 36 formed by cutting at both sides of non-separation treatment sections 33 including mainly entangled parts and the like at cutting planes 35 and in which the end portions in the lengthwise direction of the fiber bundle are relatively wide and formed as end portions extending in the direction orthogonal to the lengthwise direction of the fiber bundle, are left substantially in forms similar to their original forms. In such end portions of bundled aggregates 36, as aforementioned, a stress concentration is liable to occur, and it causes a decrease in the mechanical properties of the molded article and its variation. On the other hand, in the distribution diagram shown in FIG. 6, there is no such bundled aggregate 36 in which stress concentration is liable to occur and, for example, even in bundled aggregates 37 formed by cutting obliquely including non-separation treatment sections 33 including entangled parts and the like, each bundled aggregate 37 has a relatively narrow width and becomes narrower as it goes to the end portion, and besides, it becomes in the form of a bundled aggregate which does not have an end portion where stress concentration is liable to occur as in the bundled aggregate 36. Therefore, it becomes possible to improve the mechanical properties of the molded article and reduce the variation of the mechanical properties.

The bundled aggregate [A] of discontinuous reinforcing fibers formed as described above can have a formation, for example, wherein the bundled aggregate [A] contains at least one kind of aggregate selected from:

a separated bundle aggregate [a] divided into an arbitrary number of bundles by separation treatment;

a joined bundle aggregate [b] in which single fibers of the fiber bundle are joined to each other by the non-separation treatment section and/or the entangled part and/or the entanglement accumulation part; and a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part.

Figure 8:
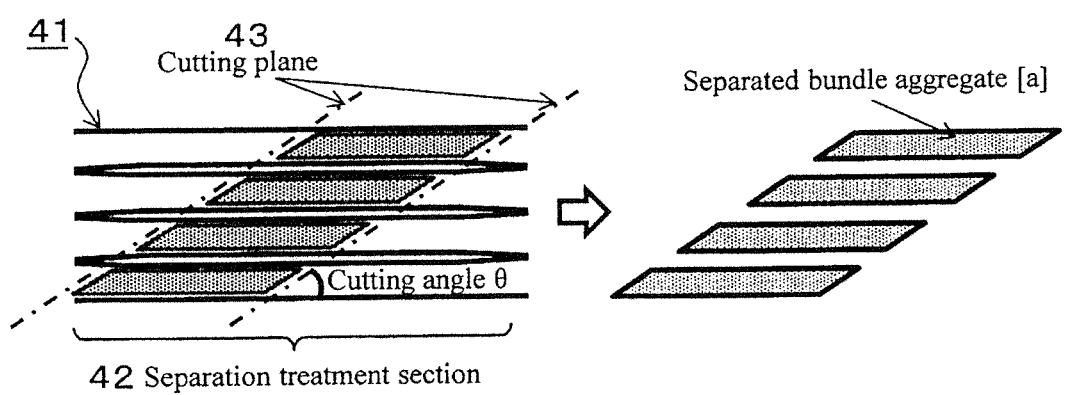
FIG. 8 is a schematic plan view showing an example of a method of manufacturing a separated bundle aggregate [a].

The above-described separated bundle aggregate [a] is, for example, as shown in FIG. 8, formed as a separated bundle aggregate [a] having a small width and a predetermined length at a formation of an arbitrary plural formation by being cut at cutting planes 43 oblique with respect to the lengthwise direction of the fiber bundle at a cutting angle θ (0°<θ<90°) within the separation treatment section 42 of the partially-separated fiber bundle 41.

Figure 9:
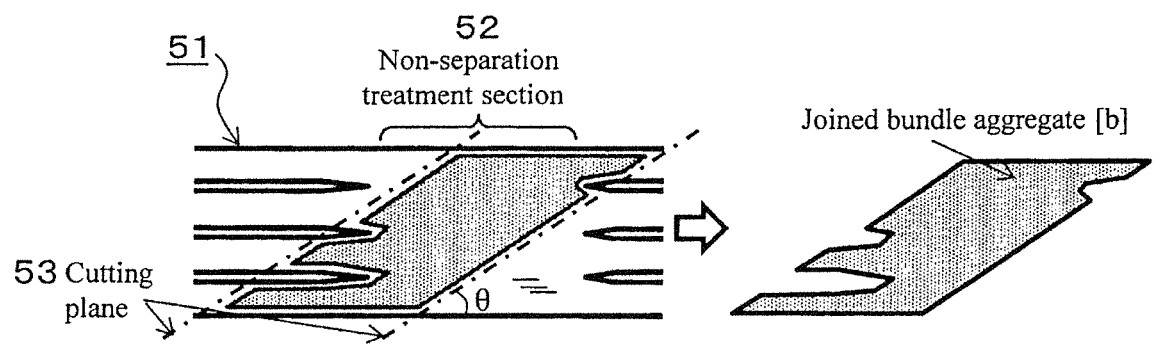
FIG. 9 is a schematic plan view showing an example of a method of manufacturing a joined bundle aggregate [b].
Figure 10:
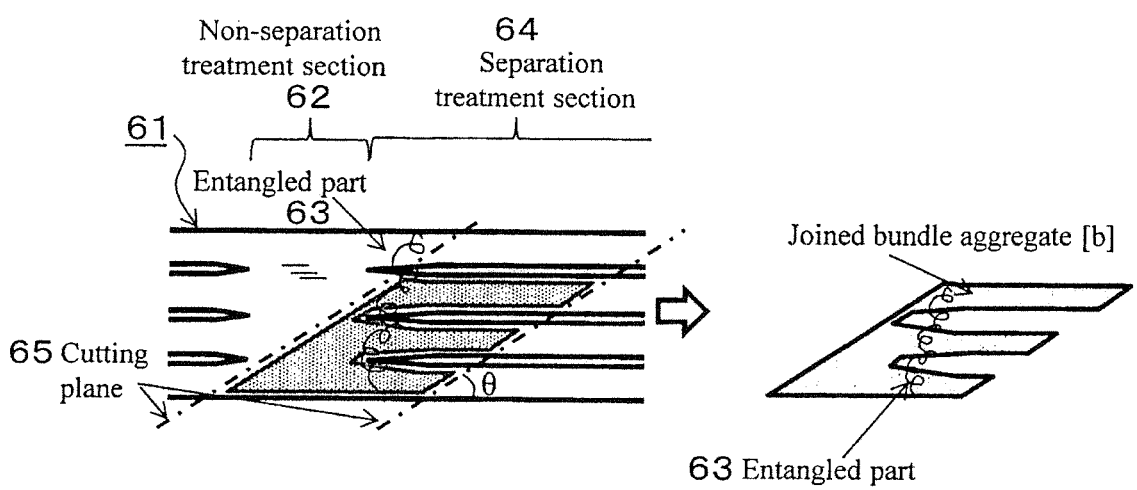
FIG. 10 is a schematic plan view showing another example of a method of manufacturing a joined bundle aggregate [b].
Figure 11:
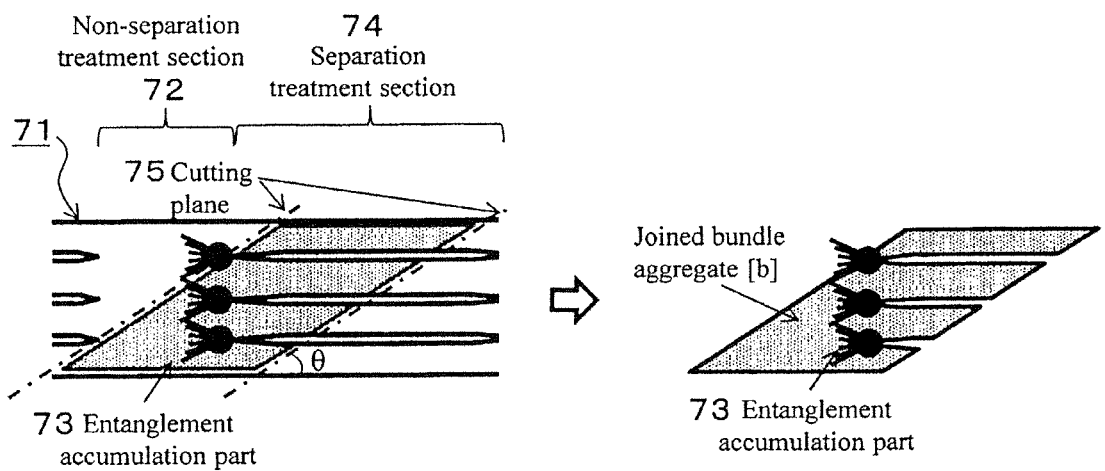
FIG. 11 is a schematic plan view showing a further example of a method of manufacturing a joined bundle aggregate [b].

As an example of the above-described joined bundle aggregate [b], the joined bundle aggregate [b] is, for example, as shown in FIG. 9, formed as a joined bundle aggregate [b] such as one made with an incision at an end portion in the lengthwise direction of the fiber bundle, by being cut at cutting planes 53 oblique with respect to the lengthwise direction of the fiber bundle at a cutting angle θ (0°<θ<90°) mainly within the non-separation treatment section 52 of the partially-separated fiber bundle 51. Alternatively, the joined bundle aggregate [b] is, for example, as shown in FIG. 10, formed as a joined bundle aggregate [b] such as one made with a deep incision at an end portion in the lengthwise direction of the fiber bundle and having an entangled part 63, by being cut at cutting planes 65 oblique with respect to the lengthwise direction of the fiber bundle at a cutting angle θ (0°<θ<90°) over the non-separation treatment section 62 and the separation treatment section 64 having the entangled part 63 at the end portion of the partially-separated fiber bundle 61. Alternatively, the joined bundle aggregate [b] is, for example, as shown in FIG. 11, formed as a joined bundle aggregate [b] such as one made with a deep incision at an end portion in the lengthwise direction of the fiber bundle and having an entanglement accumulation part 73, by being cut at cutting planes 75 oblique with respect to the lengthwise direction of the fiber bundle at a cutting angle θ (0°<θ<90°) over the non-separation treatment section 72 and the separation treatment section 74 having the entanglement accumulation part 73 at the end portion of the partially-separated fiber bundle 71.

Figure 12:
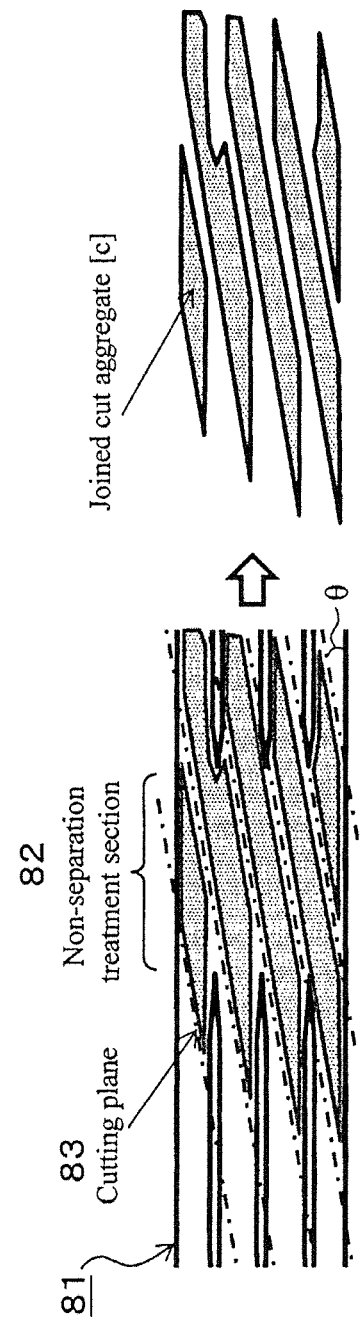
FIG. 12 is a schematic plan view showing an example of a method of manufacturing a joined cut aggregate [c].

Further, for example, as shown in FIG. 12, the above-described joined cut aggregate [c] is formed as a joined cut aggregate [c] small in width and having a relatively large average fiber bundle length in which the end portion in the lengthwise direction is further narrower in width, by being cut at cutting planes 83 oblique with respect to the lengthwise direction of the fiber bundle at a cutting angle θ (0°<θ<90°) to include mainly the non-separation treatment sections 82 of the partially-separated fiber bundle 81 or obliquely traverse the non-separation treatment sections 82 over the entire length thereof. In the illustrated example, the non-separation treatment sections 82 and the cutting plane 83 at the time of cutting of the partially-separated fiber bundle 81 intersect each other, and the joining of single fibers of the fiber bundle 81 to each other is cut off at the intersected part.

In the above-described joined cut aggregate [c], since the average length of the fiber bundle becomes relatively long, at the time of cutting of the fiber bundle or at the time of scattering the aggregates, there is a possibility that cracks are naturally generated even in the non-separation treatment section and aggregates having a smaller number of single fibers may be formed. Such aggregates made into smaller bundles are also included in the above-described joined cut aggregate [c].

The bundled aggregate [A] of discontinuous reinforcing fibers can employ a structure containing at least one kind of aggregate selected from the above-described separated bundle aggregate [a], joined bundle aggregate [b] and joined cut aggregate [c]. In the above-described bundled aggregate [A], it is preferred that the content of the joined bundle aggregates [b] is 0 to 15%, from the viewpoint of exhibiting more excellent mechanical properties and lower variation thereof. The content indicates a frequency rate of the joined bundle aggregate [b] occupied in the bundled aggregate [A]. Namely, when the total number of bundled aggregates [A] is referred as N(A) and the number of joined bundle aggregates [b] contained therein is referred as N(b), it is expressed by equation (2):

$$\{N(b)/N(A)\} \times 100 \qquad (2).$$

When producing a fiber-reinforced resin molding material containing the above-described bundled aggregates [A], it is desired that the partially-separated fiber bundle is cut to satisfy equation (1) when the above-described bundled aggregate [A] is obtained:

$$W \cdot \cos \theta / D \geq 3 \qquad (1)$$

W: width of fiber bundle at cutting partially-separated fiber bundle
D: distance between cutting planes in bundled aggregate [A].

Figure 13:
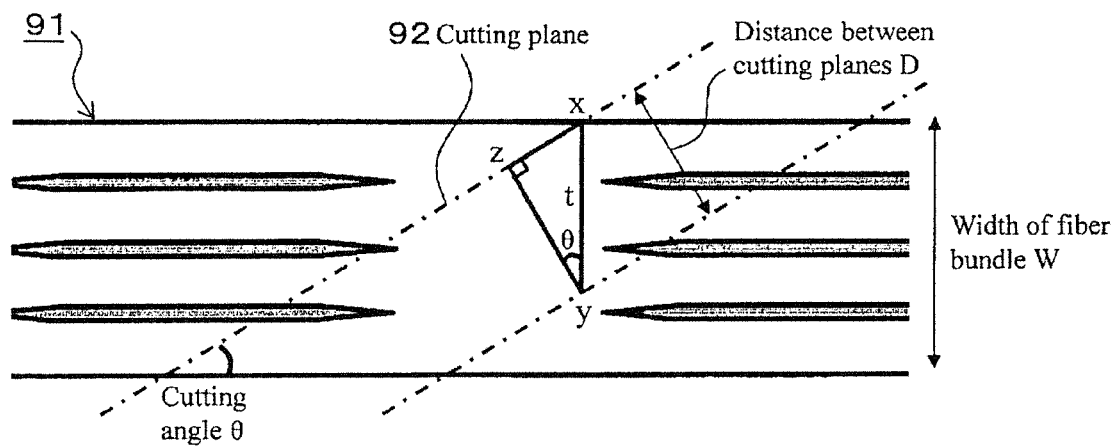
FIG. 13 is a schematic plan view explaining equation (1).

For example, as shown in FIG. 13, when the cutting angle is referred as θ, the width of the fiber bundle at the time of cutting of the partially-separated fiber bundle 91 is referred as W, and the distance between the cutting planes 92 is referred as D, the length t of the side "xy" in Δxyz is $$t = D/\cos \theta$$

and when the number W/t for cutting the width W of the fiber bundle by the cutting planes in the width direction is desired as $$W/t \geq 3$$

equation (1) stands from the above-described equation. It is preferred to cut the partially-separated fiber bundle to satisfy equation (1), because the joined cut aggregate [c] is effectively made into a small bundle to contribute to improvement of the mechanical properties.

From equation (1), it is understood that it is effective to increase W (widen the fiber bundle width) to cut the joined bundle aggregate [b] into small pieces. At this time, because by increasing W, the thickness of the bundled aggregate [A] obtained by cutting is reduced so that stress concentration at the end portion of the bundled aggregate [A] in the molded article is alleviated and the uniformity of the distribution of the bundled aggregates [A] and the matrix resin is improved, it is preferable from the viewpoint of easily exhibiting excellent mechanical properties. However, if the value of W is too large, there is a possibility that the gathering power of the single fibers forming the fiber bundle decreases, and when cutting the partially-separated fiber bundle, the form as a bundled aggregate cannot be maintained, breakage of single fibers is liable to occur and, therefore, the flowability is lowered during molding of the fiber-reinforced resin molding material. Therefore, W is preferably 5 mm≤W≤100 mm, more preferably 5 mm≤W 5≤50 mm.

Further, it is also good to reduce the cutting angle θ (0°<θ<90°). However, there is a limit from the bundle form retention and processability. Further, to satisfy equation (1), although it can be controlled also by the distance D of the cutting planes, because there is a possibility that the fiber length may fluctuate, it is good to basically set D as a fixed value to be able to cut at a target fiber length.

Figure 14:
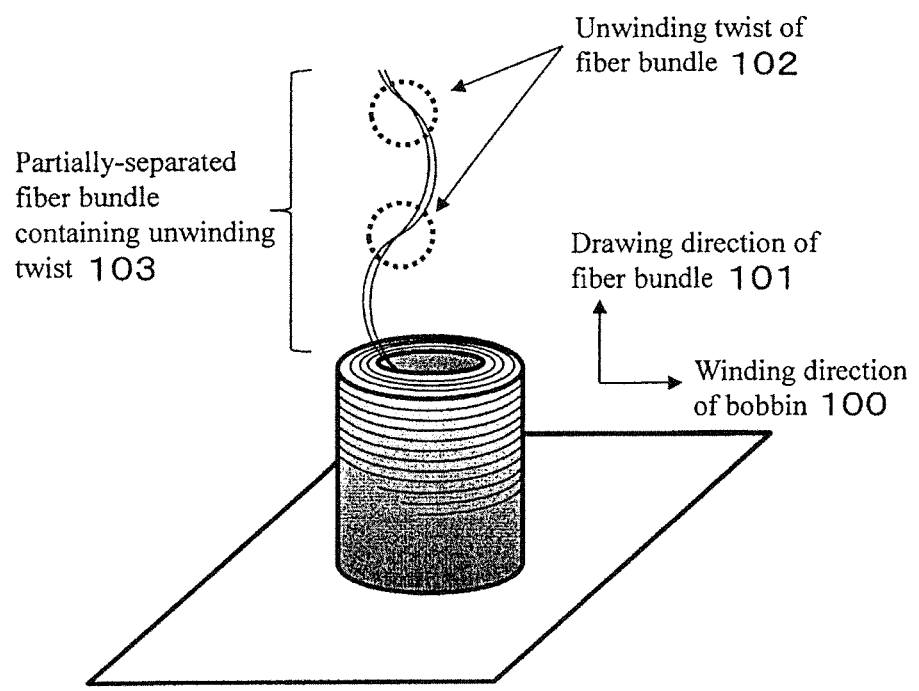
FIG. 14 is a schematic perspective view showing an example of the inside pull manner.

In the method of producing a fiber-reinforced resin molding material, it is preferred that a partially-separated fiber bundle is unwound by an inside pull manner and subjected to a cutting process at the time of obtaining the bundled aggregate [A]. The inside pull manner means a method in which a bobbin wound with fibers around a winding core (a paper tube is generally used) is placed on a creel, differently from a method in which a fiber bundle is unwound from the fiber bundle end on the outer side of the bobbin, the winding core of the bobbin is removed and, as shown in FIG. 14, at a state being installed perpendicularly to the winding direction 100 of the bobbin, the fiber bundle end located on the inner side of the bobbin is drawn out perpendicularly to the winding direction of the bobbin.

According to the above-described inside pull manner, when the partially-separated fiber bundle is subjected to the cutting process, by connecting the fiber bundle end on the outer side of the bobbin and the fiber bundle end on the inner side of the other bobbin from which the winding core is removed similarly, the cutting processing can be carried out continuously for a long time and, therefore, such a method is preferred. In particular, in the inside pull manner, it is possible to perform a work of connecting yarns in parallel with the cutting processing, thereby improving the productivity and, therefore, such a method is preferred. Further, since abrasion against the bobbin which is generated when the unwound fiber bundle traverses on the bobbin at the time of unwinding the fiber bundle disappears, it is preferred also from the viewpoint that it is possible to suppress occurrence of abrasion fluffs.

On the other hand, in the inside pull manner, since the fiber bundle is drawn out perpendicularly to the winding direction (drawing direction of fiber bundle 101), a unwinding twist 102 may be generated in the fiber bundle. When cutting the partially-separated fiber bundle 103 containing such a unwinding twist, the fiber length of the bundled aggregate [A] obtained may become nonuniform depending upon the way of twisting or the cut plane of the partially-separated fiber bundle may not be linear, but none of them is at a level that damages the desired effect, and substantially they can be handled in the same manner as cutting a fiber bundle having no twist.

Thus, by having a specified bundled aggregate [A] of discontinuous reinforcing fibers formed by cutting a partially-separated fiber bundle, in which separation treatment sections and non-separation treatment sections are alternately formed, obliquely with respect to the lengthwise direction of the fiber bundle, it is possible to realize extremely high mechanical properties (strength, modulus of elasticity) when made into a molded article, and it is possible to suppress the variation of the mechanical properties small.

EXAMPLES

Next, examples and comparative examples will be explained. It should be noted that this disclosure is not limited in any way by the Examples and Comparative Examples.

The Material
Fiber Bundle [A-1]:
A continuous carbon fiber bundle having a fiber diameter of 7 μm, a flexural modulus of 230 GPa, and a number of single fibers of 12,000 ("Torayca (registered trademark)" T700S12K-50-E, supplied by Toray Industries, Inc.) was used.

Fiber Bundle [A-2]:

A continuous carbon fiber bundle having a fiber diameter of 7.2 µm, a flexural modulus of 240 GPa, and a number of single fibers of 50,000 ("Panex 35 (registered trademark)," supplied by ZOLTEK Co., Ltd.) was used.

Matrix Resin [M-1]:

A resin compound prepared by sufficiently mixing and stirring 100 parts by weight of a vinyl ester resin ("DELAKEN (registered trademark) 790," supplied by Dow Chemical Co., Ltd.), 1 part by weight of tert-butyl peroxybenzoate ("Perbutyl (registered trademark) Z," supplied by NOF CORPORATION) as a curing agent, 4 parts by weight of magnesium oxide (MgO #40, supplied by Kyowa Chemical Industry Co., Ltd.) as a thickener, and 2 parts by weight of zinc stearate (SZ-2000, supplied by Sakai Chemical Industry Co., Ltd.) as an internal release agent.

Classification of Bundled Aggregate [A] and Calculation Method of Content of Joined Bundle Aggregate [b]

A sample of 100 mm×100 mm was cut out from a fiber-reinforced resin molding material, and the sample was heated in a furnace at 600° C. for 1 hour to remove the resin. Subsequently, 400 of bundled aggregates [A] were taken out from the sample removed with the resin using tweezers, and they were classified into separated bundle aggregates [a], joined bundle aggregates [b] and joined cut aggregates [c].

Separated Bundle Aggregate [a]:

In a partially-separated fiber bundle, the small bundles divided originating from the applied separation treatment were determined as separated bundle aggregates [a].

Joined Bundle Aggregate [b]:

In a partially-separated fiber bundle, one capable of being judged to be "in a shape joined with bundles with each other" by inter-bundle joining factors such as non-separation treatment section, entangled part, entanglement accumulation part and the like was determined as joined bundle aggregate [b]. The term "a shape joined with bundles with each other" means a state where when bundled aggregates[A] are lifted using tweezers, at least two bundles of the bundled aggregates [A] are simultaneously lifted and, even if vibrated softly, they do not separate into individual bundles.

Joined Cut Aggregate [c]:

In a partially-separated fiber bundle, one having a trace divided by cutting inter-bundle joining factors such as non-separation treatment section, entangled part, entanglement accumulation part and the like, or one capable of being judged to be made into a small piece by natural thread splitting in the process after being cut, was determined as joined cut aggregate [c].

Furthermore, the content of joined bundle aggregates [b] in a fiber-reinforced resin molding material was calculated from the total number of joined bundle aggregates [b] classified as described above.

Evaluation Method of Mechanical Properties

A mold No. 1 capable of producing a flat plate was used. A fiber-reinforced resin molding material was placed in the central portion of the mold No. 1 (50% in terms of charge rate), and then cured under a pressure of 10 MPa by a pressurizing-type press machine at a condition of about 140° C.×5 minutes to obtain a flat plate of 300×400 mm. In a condition where the lengthwise direction of the flat plate was referred to as 0° direction, five pieces (total 10 pieces) of 100×25×1.6 mm specimens were cut out from the directions of 0° and 90°, respectively, from the obtained flat plate, and the measurement was carried out in accordance with JIS K 7074 (1988).

Example 1

The fiber bundle [A-1] was unwound at a constant speed of 10 m/min using a winder, passed through a vibration widening roll vibrating in its axial direction at 5 Hz, and after a widening treatment was applied, it was passed through a width regulating roll of 20 mm in width to obtain a widened fiber bundle widened to 20 mm in width. For the obtained widened fiber bundle, a separation treatment means was prepared in which iron plates for separation treatment each having a protruding shape with a thickness of 0.2 mm, a width of 3 mm and a height of 20 mm were arranged in parallel to each other at equal intervals of 5 mm with respect to the width direction of the reinforcing fiber bundle. This separation treatment means was intermittently pierced into and pulled out from the widened fiber bundle to obtain a partially-separated fiber bundle.

At this time, the separation treatment means was pierced into the widened fiber bundle running at a constant speed of 10 m/min for 3 seconds to create a separation treatment section, pulled out therefrom in 0.2 second, and the operation of piercing again was repeated.

In the resulting partially-separated fiber bundle, the fiber bundle was divided into four parts in the width direction in the separation treatment section, and in at least one end portion of at least one separation treatment section, an entanglement accumulation part, in which entangled parts each tangled with single fibers were accumulated, was present. When the partially-separated fiber bundle was manufactured by 1,500 m, the twists of the fibers existing in the fiber bundle passed through in the running direction when pulling out and piercing the separation treatment means without causing yarn breakage and winding at all, and the separation treatment could be carried out with the stable width.

The obtained partially-separated fiber bundle was installed in the creel, unwound from the end of the fiber bundle on the outer side of the bobbin, and inserted continuously into a rotary cutter whose cutting blade was inclined at an angle of 15° with respect to the lengthwise direction of the fiber bundle to cut the fiber bundle, and the bundled aggregate [A] of discontinuous reinforcing fibers was obtained. At this time, the cutting interval was adjusted to 6.5 mm in advance so that it could be cut to a fiber length of 25 mm. Further, although the inserted partially-separated fiber bundle was widened up to 20 mm width when applying the above-described separation treatment process due to the winding process of the partially-separated fiber bundle and thread tension applied during cutting process, the width W of the fiber bundle at the time of cutting was 7 mm.

Subsequent to the above-described cutting process, a discontinuous fiber nonwoven fabric with fiber orientation isotropic was obtained by scattering the bundled aggregates [A] to be uniformly dispersed. The areal weight of the obtained discontinuous fiber nonwoven fabric was 1 kg/m$^2$.

The matrix resin [M-1] was uniformly applied to respective two sheets of polypropylene release films using a doctor blade to make two resin sheets. A sheet-like fiber-reinforced resin molding material was obtained by nipping the above-described obtained discontinuous fiber nonwoven fabric with these two resin sheets and impregnating the resin into the nonwoven fabric by a roller. At this time, the amount of resin application was adjusted at the stage of manufacturing the resin sheets so that the weight content of the reinforcing fibers of the fiber-reinforced resin molding material became 47%.

With respect to the obtained fiber-reinforced resin molding material, when the content of the joined bundle aggregates [b] was calculated based on the classification of the bundled aggregates [A] and the method of calculating the content of the joined bundle aggregates [b], it was 13%. Further, based on the aforementioned evaluation method of mechanical properties, a fiber-reinforced resin molding material was molded and the mechanical properties were evaluated. The series of evaluation results obtained are shown in Table 1.

Example 2

The fiber bundle [A-2] was unwound at a constant speed of 10 m/min using a winder, passed through a vibration widening roll vibrating in its axial direction at 10 Hz, and after a widening treatment was applied, it was passed through a width regulating roll of 60 mm in width to obtain a widened fiber bundle widened to 60 mm in width. The evaluation was carried out similarly to in Example 1 other than a condition where a partially-separated fiber bundle was manufactured by using a separation treatment means in which iron plates for separation treatment each having a protruding shape against the obtained widened fiber bundle were arranged in parallel to each other at equal intervals of 3.5 mm with respect to the width direction of the reinforcing fiber bundle. At this time, in the obtained partially-separated fiber bundle, the fiber bundle was divided into 17 parts in the width direction in the separation treatment section, and in at least one end portion of at least one separation treatment section, an entanglement accumulation part, in which entangled parts each tangled with single fibers were accumulated, was present. Further, since the number of single fibers was larger than that of the fiber bundle [A-1], the width W at the time of fiber bundle cutting was 20 mm. The series of evaluation results obtained are shown in Table 1.

Example 3

The evaluation was carried out similarly to in Example 2 other than a condition where the cutting interval was adjusted to 3.2 mm so that the fiber length of the bundled aggregate [A] was 12.5 mm. The series of evaluation results obtained are shown in Table 1.

Example 4

The evaluation was carried out similarly to in Example 2 other than a condition where the inclination of the cutting blade of the rotary cutter was adjusted and the cutting interval was adjusted to 6.2 mm so that the cutting angle of the fiber bundle was 30° and the fiber length was 12.5 mm. The series of evaluation results obtained are shown in Table 1.

Example 5

The evaluation was carried out similarly to in Example 2 other than a condition where the inclination of the cutting blade of the rotary cutter was adjusted and the cutting interval was adjusted to 8.8 mm so that the cutting angle of the fiber bundle was 45° and the fiber length was 12.5 mm. The series of evaluation results obtained are shown in Table 1.

Example 6

The evaluation was carried out similarly to in Example 3 other than a condition where a squeezing roller for maintaining the widened width of the fiber bundle was installed at a position immediately before winding of the partially-separated fiber bundle so that the width W at the time of cutting was 30 mm, thereby adjusting the width of the partially-separated fiber bundle. The series of evaluation results obtained are shown in Table 1.

Example 7

The evaluation was carried out similarly to in Example 2 other than a condition where a squeezing roller for maintaining the widened width of the fiber bundle was installed at a position immediately before winding of the partially-separated fiber bundle so that the width W at the time of cutting was 45 mm, thereby adjusting the width of the partially-separated fiber bundle. The series of evaluation results obtained are shown in Table 1.

Example 8

The evaluation was carried out similarly to in Example 3 other than a condition where, when unwinding the fiber bundle to insert it into the rotary cutter, the paper tube wound with the fiber bundle was removed, and the fiber bundle was drawn out from the end of the fiber bundle inside the bobbin by the inside pull manner. The series of evaluation results obtained are shown in Table 1.

Comparative Example 1

The evaluation was carried out similarly to in Example 1 other than a condition where a bundled aggregate [A] was obtained using a rotary cutter having cutting blades set at an angle of 90° with respect to the lengthwise direction of the fiber bundle and a cutting interval of 25 mm when cutting the partially-separated fiber bundle. The series of evaluation results obtained are shown in Table 2.

Comparative Example 2

The evaluation was carried out similarly to in Example 2 other than a condition where a bundled aggregate [A] was obtained using a rotary cutter having cutting blades set at an angle of 90° with respect to the lengthwise direction of the fiber bundle and a cutting interval of 25 mm when cutting the partially-separated fiber bundle. The series of evaluation results obtained are shown in Table 2.

Comparative Example 3

The evaluation was carried out similarly to in Example 2 other than a condition where a bundled aggregate [A] was obtained by cutting the fiber bundle [A-2] without subjecting it to separation treatment. The series of evaluation results obtained are shown in Table 2.

TABLE 1

| | | Unit | Example | | | | | | | |
|---|---|---|---|---|---|---|---|---|---|---|
| | | | 1 | 2 | 3 | 4 | 5 | 6 | 7 | 8 |
| Used raw material | Reinforcing fibers | — | [A-1] | [A-2] | [A-2] | [A-2] | [A-2] | [A-2] | [A-2] | [A-2] |
| | Matrix resin | — | [M-1] | [M-1] | [M-1] | [M-1] | [M-1] | [M-1] | [M-1] | [M-1] |
| Bundled aggregate [A] | Cutting angle θ | ° | 15 | 15 | 15 | 30 | 45 | 15 | 15 | 15 |
| | Fiber length | mm | 25 | 25 | 12.5 | 12.5 | 12.5 | 12.5 | 12.5 | 12.5 |
| | Width of fiber bundle at cutting W | mm | 7 | 20 | 20 | 20 | 20 | 30 | 45 | 20 |
| | Value of W · cos θ/D | — | 1 | 3 | 6 | 3 | 2 | 9 | 14 | 6 |
| | Content of joined bundle aggregate [b] | % | 13 | 10 | 9 | 12 | 15 | 8 | 5 | 9 |
| Mechanical properties | Flexural strength | MPa | 430 | 410 | 440 | 390 | 370 | 450 | 460 | 430 |
| | Flexural modulus | GPa | 25 | 24 | 25 | 23 | 21 | 26 | 27 | 27 |
| | CV value of flexural modulus | % | 12 | 15 | 12 | 15 | 18 | 10 | 8 | 11 |

TABLE 2

| | | Unit | Comparative Example | | |
|---|---|---|---|---|---|
| | | | 1 | 2 | 3 |
| Used raw material | Reinforcing fibers | — | [A-1] | [A-2] | [A-2] |
| | Matrix resin | — | [M-1] | [M-1] | [M-1] |
| Bundled aggregate [A] | Cutting angle θ | ° | 90 | 90 | 15 |
| | Fiber length | mm | 25 | 25 | 25 |
| | Width of fiber bundle at cutting W | mm | 7 | 20 | 20 |
| | Value of W · cos θ/D | — | 0 | 0 | 3 |
| | Content of joined bundle aggregate [b] | % | 30 | 30 | 45 |
| Mechanical properties | Flexural strength | MPa | 380 | 350 | 390 |
| | Flexural modulus | GPa | 23 | 22 | 24 |
| | CV value of flexural Modulus | % | 25 | 25 | 24 |

Examples 1 to 8 exhibited excellent mechanical properties (flexural strength, flexural modulus) and low variation at the same time. With respect to Examples 4 and 5, we confirmed that the mechanical properties were lowered because the stress concentration at the end portion of the fiber bundle was increased by increasing the cutting angle, but it was confirmed that it was a level with no problem. Further, with respect to Examples 3, 6 and 7, we confirmed that by adjusting the width of the fiber bundle at the time of cutting, the joining factors between bundles such as non-separation treatment sections, entangled parts and entanglement accumulation parts could be made small, and it was extremely effective for improvement of the mechanical properties and reduction of the variation (for example, reduction of the CV (Coefficient of Variation) value of the flexural modulus). With respect to Example 8, a small amount of bundled aggregates [A] obtained by cutting the partially-separated fiber bundle were sampled at the time of scattering them and the fiber length was confirmed. As a result, although bundled aggregates with the fiber length deviated from 12.5 mm were observed, their proportion was small, and it was a level capable of being judged to be cut substantially to the aimed fiber length.

On the other hand, with respect to Comparative Examples 1 to 3, in Comparative Examples 1 and 2, because the cutting was carried out at the angle of the fiber bundle of 90°, stress concentration occurred at the end portion of the fiber bundle and, further, the content of the joined bundle aggregates [b] was high, and the decrease of mechanical properties and the increase of the variation were observed. In addition, in Comparative Example 3, because the reinforcing fiber bundle was not subjected to the separation treatment, the content of the joined bundle aggregates [b] was high, and similar to Comparative Examples 1 and 2, the decrease of mechanical properties and the increase of the variation were observed.

INDUSTRIAL APPLICABILITY

We provide a fiber-reinforced resin molding material that can be used to manufacture any molded article needing particularly high mechanical properties and reduction of variation of the mechanical properties.

The invention claimed is:

1. A fiber-reinforced resin molding material containing at least bundled aggregates [A] of discontinuous reinforcing fibers and a matrix resin [M], wherein each of the bundled aggregates [A] is obtained by cutting a partially-separated fiber bundle, prepared by forming separation treatment sections separated into a plurality of bundles and non-separation treatment sections alternately along a lengthwise direction of a fiber bundle comprising a plurality of single fibers, at an angle θ ($0°<θ<90°$) with respect to the lengthwise direction of the fiber bundle.

2. The fiber-reinforced resin molding material according to claim 1, wherein, in the partially-separated fiber bundle, an entangled part in which the plurality of single fibers are tangled with each other and/or an entanglement accumulation part in which the entangled parts are accumulated is formed in at least one end portion of at least one of the separation treatment sections.

3. The fiber-reinforced resin molding material according to claim 2, wherein the bundled aggregate [A] contains at least one kind of aggregate selected from:
   a separated bundle aggregate [a] divided into an arbitrary number of bundles by separation treatment;
   a joined bundle aggregate [b] in which single fibers of the fiber bundle are joined to each other by the non-separation treatment section and/or the entangled part and/or the entanglement accumulation part; and
   a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part.

4. The fiber-reinforced resin molding material according to claim 3, wherein, in the bundled aggregate [A], the content of the joined bundle aggregate [b] is 0 to 15%.

5. A method of producing a fiber-reinforced resin molding material according to claim 2, comprising cutting the partially-separated fiber bundle to satisfy equation (1) when the bundled aggregate [A] is obtained:

$$W \cdot \cos \theta / D \geq 3 \tag{1}$$

W: width of fiber bundle at cutting partially-separated fiber bundle

D: distance between cutting planes in bundled aggregate [A].

6. The fiber-reinforced resin molding material according to claim 1, wherein the bundled aggregate [A] contains at least one aggregate selected from:
- a separated bundle aggregate [a] divided into an arbitrary number of bundles by separation treatment;
- a joined bundle aggregate [b] in which single fibers of the fiber bundle are joined to each other by the non-separation treatment section and/or the entangled part and/or the entanglement accumulation part; and
- a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part.

7. The fiber-reinforced resin molding material according to claim 6, wherein, in the bundled aggregate [A], the content of the joined bundle aggregate [b] is 0 to 15%.

8. A method of producing a fiber-reinforced resin molding material according to claim 7, comprising cutting the partially-separated fiber bundle to satisfy equation (1) when the bundled aggregate [A] is obtained:

$$W \cdot \cos \theta / D \geq 3 \tag{1}$$

W: width of fiber bundle at cutting partially-separated fiber bundle

D: distance between cutting planes in bundled aggregate [A].

9. A method of producing a fiber-reinforced resin molding material according to claim 1, comprising cutting the partially-separated fiber bundle to satisfy equation (1) when the bundled aggregate [A] is obtained:

$$W \cdot \cos \theta / D \geq 3 \tag{1}$$

W: width of fiber bundle at cutting partially-separated fiber bundle

D: distance between cutting planes in bundled aggregate [A].

10. The method according to claim 9, further comprising subjecting the partially-separated fiber bundle to widening treatment at an arbitrary timing before cutting the partially-separated fiber bundle.

* * * * *